(12) United States Patent
Homiller et al.

(10) Patent No.: US 7,522,101 B2
(45) Date of Patent: Apr. 21, 2009

(54) POSITIONING SYSTEM FOR PORTABLE ELECTRONIC DEVICES

(75) Inventors: Daniel P. Homiller, Cary, NC (US); William O. Camp, Jr., Chapel Hill, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 167 days.

(21) Appl. No.: 11/363,745

(22) Filed: Feb. 28, 2006

(65) Prior Publication Data
US 2007/0200757 A1 Aug. 30, 2007

(51) Int. Cl.
G01S 1/00 (2006.01)
G01C 21/00 (2006.01)

(52) U.S. Cl. ............... 342/357.15; 342/357.06; 701/213

(58) Field of Classification Search ......... 342/357.01–357.17; 701/213
See application file for complete search history.

(56) References Cited

U.S. PATENT DOCUMENTS

| | | | |
|---|---|---|---|
| 5,952,958 A | 9/1999 | Speasl et al. | |
| 6,188,351 B1 | 2/2001 | Bloebaum | |
| 6,201,497 B1 * | 3/2001 | Snyder et al. | 342/357.06 |
| 6,204,808 B1 | 3/2001 | Bloebaum et al. | |
| 6,295,023 B1 | 9/2001 | Bloebaum | |
| 6,323,803 B1 | 11/2001 | Jolley et al. | |
| 6,336,076 B1 | 1/2002 | Farley et al. | |
| 6,433,735 B1 | 8/2002 | Bloebaum et al. | |
| 6,438,382 B1 | 8/2002 | Boesch et al. | |
| 6,535,815 B2 | 3/2003 | Bloebaum | |
| 6,603,978 B1 | 8/2003 | Carlsson et al. | |
| 6,724,342 B2 | 4/2004 | Bloebaum et al. | |
| 6,801,778 B2 | 10/2004 | Koorapaty et al. | |
| 6,886,029 B1 * | 4/2005 | Pecus et al. | 709/203 |
| 6,937,865 B1 | 8/2005 | Bloebaum et al. | |
| 2003/0128711 A1 * | 7/2003 | Olariu et al. | 370/401 |
| 2004/0010368 A1 * | 1/2004 | Scott | 701/213 |
| 2004/0203853 A1 * | 10/2004 | Sheynblat | 455/456.1 |
| 2006/0077096 A1 * | 4/2006 | King et al. | 342/357.15 |

FOREIGN PATENT DOCUMENTS

WO WO 2004/081600 9/2004

* cited by examiner

Primary Examiner—Thomas H Tarcza
Assistant Examiner—Harry Liu
(74) Attorney, Agent, or Firm—Renner Otto Boisselle & Sklar

(57) ABSTRACT

A method for providing information to a GPS receiver includes selecting an apparent location and receiving positioning information corresponding to the positions of a plurality of satellites. The positioning information is combined and transmitted as a radio frequency signal that can be received by a GPS receiver. When the GPS receiver demodulates the radio frequency signal and calculates its position, the calculated position will be approximately at the apparent location, regardless of where the GPS receiver is physically located.

41 Claims, 6 Drawing Sheets

POSITIONING SYSTEM FOR PORTABLE ELECTRONIC DEVICES

TECHNICAL FIELD OF THE INVENTION

The present invention relates generally to the positioning of portable electronic devices, and, more particularly, to a system and method for providing positioning information to portable electronic devices.

DESCRIPTION OF THE RELATED ART

In recent years, portable radio communication devices, such as mobile phones, personal digital assistants, mobile terminals, etc., have grown in popularity and continue to grow in popularity. At least anecdotally, it can be said that everyone seems to have a mobile phone these days. As the popularity of portable radio communication devices continues to grow, mobile phones and networks are being enhanced to provide services beyond voice services.

Portable electronic devices are appealing to users because of their capability to serve as powerful communication and data service tools. With the increasingly busy lifestyles of many users of portable radio communication devices, users place a premium on making efficient use of time. It is well known that position determination of portable electronic devices is highly desirable, especially in emergency situations. It is also well known that this determination is very difficult to perform reliably and cost-effectively. Several solutions have been proposed and/or implemented, including various terrestrial radio triangulation techniques (TDOA, EOTD, etc.) as well as the use of the federal government's Global Positioning System (GPS).

A basic GPS is illustrated in FIG. 1. GPS is a space-based triangulation system that uses satellites 10 and computers 12 to measure positions anywhere on the earth. GPS was first developed by the United States of America Department of Defense as a navigational system. The advantages of this navigational system compared to other land-based systems are that GPS is not limited in its coverage area, provides continuous 24-hour coverage, regardless of weather conditions, and is highly accurate. While the GPS technology that provides the greatest level of accuracy has been retained by the government for military use, a less accurate service has been made available for civilian use. In operation, a constellation of twenty-four satellites 10 continually orbiting the earth each emit a GPS radio signal 14. A GPS receiver 16, e.g., a hand-held radio receiver with a GPS processor, receives the radio signals from the above the horizon satellites and measures the time that the radio signal takes to travel from the GPS satellites 10 to the antenna of the GPS receiver 16. By multiplying the travel time by the speed of light, the GPS receiver 16 can calculate a range for each satellite 10 in view. Ephemeris information provided in the GPS radio signal 14 typically describes the orbit and velocity of the satellite 10, thereby enabling the GPS processor to calculate the position of the GPS receiver 16 through a process of triangulation.

As is well known, the GPS signal 14 is a composite signal containing a Course/Acquisition code (C/A code) signal, a navigation system data signal and a Precise code (P code) signal. The C/A code is a sequence of 1,023 pseudo-random, binary, biphase modulations on the GPS signal 14 at a chip rate of 1.023 MHz. The C/A code uniquely identifies each satellite and the GPS receiver 16 is configured to search for known C/A codes. The navigation system data signal reports the location of the satellite 10, clock corrections and health. Included is ephemeris data associated with each satellite signal and almanac data containing rough information for all the satellites 10 in the constellation. Like the C/A code, the P code is also a sequence of pseudo random, binary, biphase modulations on the GPS signal 14, but it has a chip rate of 10.23 MHz that repeats about every 267 days. Each one week segment of this code is unique to one GPS satellite 10 and is reset each week.

This process of initializing a GPS receiver 16 may take several minutes. The duration of the GPS positioning process is directly dependent upon how much information a GPS receiver 16 has prior to receiving GPS signals 14. GPS receivers 16 are often programmed with almanac data, which coarsely describes the expected positions for satellites 10 up to one year in the future.

A GPS receiver 16 typically requires the acquisition of a set of navigational parameters from the navigational data signals of three or more GPS satellites 10. To obtain this information, the GPS receiver 16 looks for a C/A code associated with a known satellite 10. A typical GPS receiver 16 multiplies a copy of sequence it expects to receive from the satellite 10 with the GPS signal 14 it actually receives from the satellite 10 and shifts the starting time of that sequence until it is aligned in time with the GPS signal 14. Once it is aligned, the GPS receiver can demodulate navigation system data messages from the GPS signal 14. GPS receivers 16 can then access the demodulated time information and ephemeris data from navigational data of GPS signals 14. This data is then used to determine the GPS time and location of the satellites. From this information, the GPS receiver can determine its location with respect to the satellites, and thus, determine its global position.

If the GPS receiver does not know its approximate location prior to searching for GPS signals, however, the GPS receiver will be unable to find or acquire signals from the visible satellites quickly, and therefore, the GPS receiver will be unable to calculate its position quickly. Furthermore, it should be noted that higher signal strength is needed to capture the C/A code and demodulate the navigation data than is needed for continued monitoring of an already-acquired signal.

In addition, the design link margin when using a typical GPS receiver might only be about 6 dB. This means that if foliage, a building, etc. intrude between the GPS receiver and the GPS satellite, the GPS signal may be lost and/or unusable. Accordingly, GPS receiver antennas must be highly efficient and perhaps larger than desired, as the receiver designer may unable to afford the loss in efficiency that comes with miniaturizing or hiding the antenna inside the portable electronic device. Moreover, even using known techniques for enhancing the sensitivity of a GPS receiver in a portable electronic device, the GPS receiver still may not be able to receive satellite signals in many indoor environments.

GPS receiver reception has become increasingly important as governmental mandates, e.g., the response time requirements of the FCC Phase II E-911 service, require that the position of a mobile handset be quickly determinable. If the mobile handset is located in an indoor environment and unable to receive satellite signals, the GPS receiver of the mobile handset will be unable to determine its position.

One known approach to solving this problem is through the use of repeaters between the satellite and the GPS receiver. This approach involves placing a GPS antenna in a location, such as on the roof of a building, where the GPS satellite signals are strong enough to be acquired and tracked. The GPS antenna receives the GPS satellite signals, which are then amplified and routed via RF cables to at least one interior antenna for transmission inside the building. This approach is effective but has some disadvantages. The most obvious disadvantage is that physically installing the exterior antenna and routing RF cables to interior antennas can be problematic. Another disadvantage is that the relative time differences between the GPS signals transmitted throughout the interior of the building are the same as those time differences between the GPS signals received by the GPS antenna. Thus, an indoor GPS receiver utilizing the re-radiated GPS signals will calculate its position as that of the exterior antenna. Moreover, the GPS receiver inside the building will also calculate a time that is inaccurate due to the latency of the retransmission.

SUMMARY

One aspect of the present invention relates to a method for providing information to a GPS receiver. The method includes selecting an apparent location, receiving positioning information corresponding to the positions of a plurality of satellites and transmitting the positioning information as a radio frequency signal that can be received and used by a GPS receiver to calculate the position of the GPS receiver as being located at the apparent location.

According to another aspect, the apparent location is different than the location of the GPS receiver.

According to another aspect, the positioning information comprises almanac information, ephemeris information and C/A code information.

According to another aspect, the positioning information further comprises timing information.

According to another aspect, the positioning information for at least one of the plurality of satellites is time shifted with respect to the positioning information for the other of the plurality of satellites.

According to another aspect, the positioning information for each of a plurality of satellites is mixed prior to transmission as a radio frequency signal.

According to another aspect, at least part of the positioning information is received from an orbiting GPS satellite.

According to another aspect, the method further includes aligning the positioning information with GPS time such that a GPS receiver can determine the position of the GPS receiver using an off-the-air GPS signal together with the radio frequency signal containing positioning information.

According to another aspect, the GPS receiver is a mobile phone.

According to another aspect, the radio frequency signal is identifiable by a GPS receiver as originating from a source other than an orbiting GPS satellite.

According to another aspect, the radio frequency signal is transmitted intermittently.

According to another aspect, the navigation data information data rate of the radio frequency signal is greater than the navigation data information data rate of an off-the-air GPS signal.

According to another aspect, the steps of the method are executed according to an application program loaded or stored on electronic hardware communicably coupled to a radio frequency transmitter.

According to another aspect, the method further includes receiving the radio frequency signal at a GPS receiver and determining the position of the GPS receiver using information contained in the radio frequency signal.

According to another aspect, the apparent location and the GPS receiver are inside a building.

According to another aspect, at least some of the positioning information is received from at least one source other than an off-the-air GPS signal.

According to another aspect, the positioning information is not aligned with GPS time.

According to another aspect, the at least one source other than an off-the-air GPS signal comprises a remote server accessible via the Internet.

According to another aspect, at least some of the positioning information corresponds to the position of a simulated satellite.

According to another aspect the positioning information comprises C/A codes and fabricated ephemeris and almanac information.

According to another aspect, the simulated satellite is a satellite having an orbit that is offset by approximately six hours from the apparent location. The real satellite is on the other side of the globe and is made visible to the GPS receiver by shifting the time in the navigation data message by approximately six hours.

According to another aspect, the positioning information corresponding to the position of the simulated satellite is aligned with GPS time such that a GPS receiver can use an off-the-air GPS signal together with the radio frequency signal containing positioning information corresponding to the position of the simulated to determine the position of the GPS receiver.

According to another aspect, the positioning information corresponds to the positions of simulated satellites having orbits that are offset by approximately six hours from the GPS time.

According to another aspect, the positioning information corresponding to the position of the simulated satellites is not aligned with GPS time.

Another aspect of the present invention relates to a method of increasing the ability of a GPS receiver to determine the position of the GPS receiver. The method includes selecting a location of a space within which to increase the ability of a GPS receiver to determine the position of the GPS receiver, broadcasting to the selected location a signal containing navigation information for a plurality of orbiting GPS satellites, determining the positions of the plurality of orbiting GPS satellites using the signal containing the navigation information and determining the position of the GPS receiver with respect to the plurality of orbiting GPS satellites using off-the-air GPS signals from the plurality of orbiting GPS satellites.

According to another aspect, the navigation information comprises almanac and ephemeris information.

According to another aspect, the signal containing navigation information is a radio frequency signal.

Another aspect of the present invention relates to a system for transmitting information to a GPS receiver. The system includes a memory for storing an apparent location and an application program and a controller that executes the application program. When executed, the application program causes the system to receive positioning information corresponding to positions of a plurality of satellites and transmit the positioning information as a radio frequency signal that can be received and used by a GPS receiver to calculate the position of the GPS receiver as being located at the apparent location.

According to another aspect, the apparent location is different than the location of the GPS receiver.

According to another aspect, the positioning information for at least one of the plurality of satellites is time shifted with respect to the positioning information for the other of the plurality of satellites.

According to another aspect, the positioning information for each of a plurality of satellites is mixed prior to transmission as a radio frequency signal.

According to another aspect, the application program when executed further causes the system to align the positioning information with GPS time such that a GPS receiver can determine the position of the GPS receiver using an off-the-air GPS signal together with the radio frequency signal containing positioning information.

According to another aspect, the radio frequency signal is identifiable by a GPS receiver as originating from a source other than an orbiting GPS satellite.

According to another aspect, at least some of the positioning information is received from at least one source other than an off-the-air GPS signal.

According to another aspect, the positioning information is not aligned with GPS time.

According to another aspect, at least some of the positioning information corresponds to the position of a simulated satellite.

According to another aspect the positioning information comprises C/A codes and fabricated ephemeris and almanac information.

According to another aspect, the simulated satellite is a satellite having an orbit that is offset by approximately six hours from the apparent location.

According to another aspect, the positioning information corresponding to the position of the simulated satellite is aligned with GPS time such that a GPS receiver can use an off-the-air GPS signal together with the radio frequency signal containing positioning information corresponding to the position of the simulated to determine the position of the GPS receiver.

According to another aspect, all of the positioning information corresponds to the positions of simulated satellites having orbits that are offset by approximately six hours from the apparent location.

According to another aspect, the positioning information corresponding to the position of the simulated satellites is not aligned with GPS time.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended thereto.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Likewise, elements and features depicted in one drawing may be combined with elements and features depicted in additional drawings. Moreover, in the drawings, like reference numerals designate corresponding parts throughout the several views.

DETAILED DESCRIPTION OF EMBODIMENTS

Figure 1:
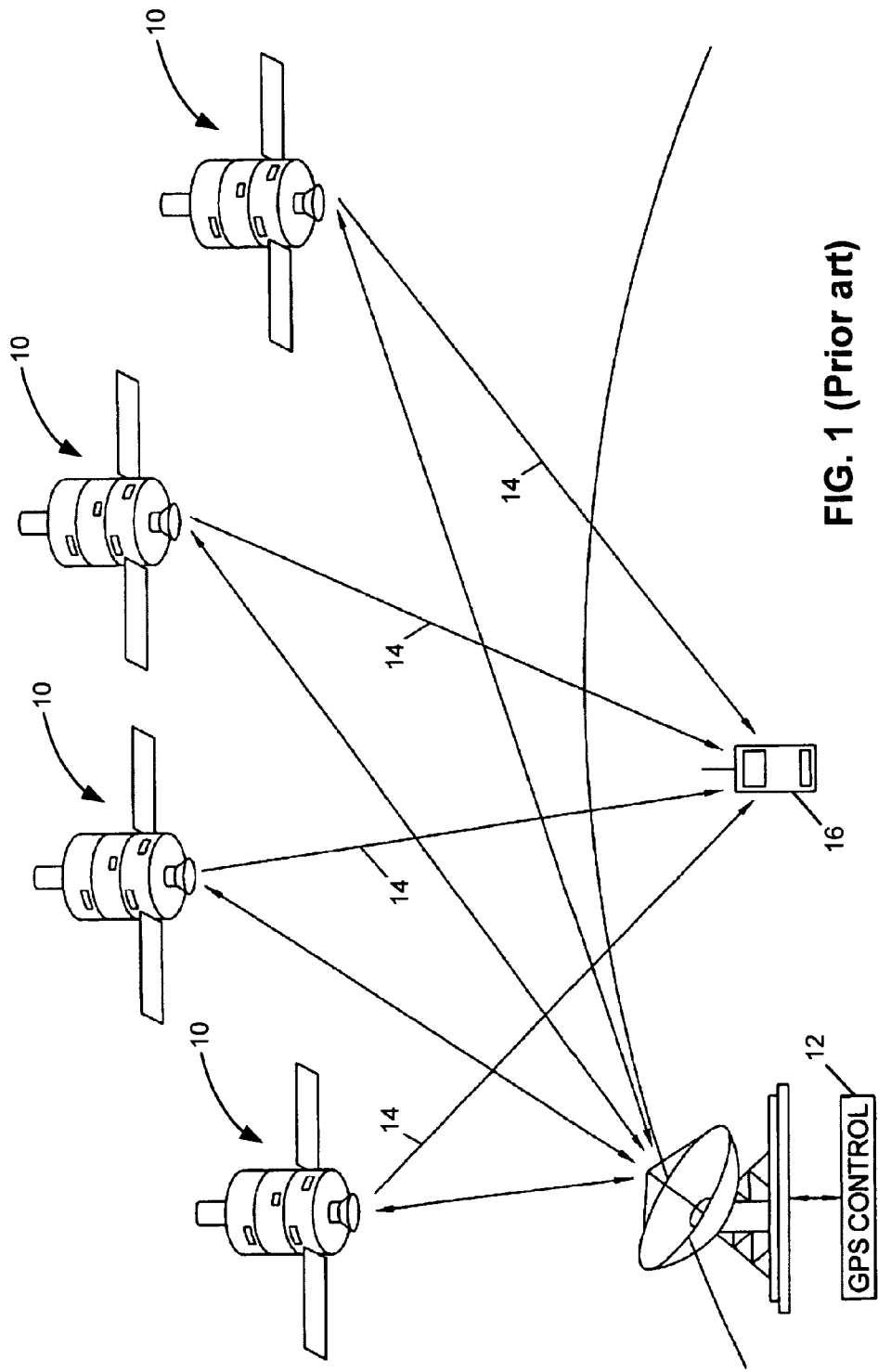
FIG. 1 is a diagrammatic illustration of a GPS communication system.

In the detailed description that follows, like components have been given the same reference numerals regardless of whether they are shown in different embodiments of the present invention. To illustrate the present invention in a clear and concise manner, the drawings may not necessarily be to scale and certain features may be shown in somewhat schematic form.

As used herein, the term "electronic equipment" includes portable positioning devices, such as GPS devices, and portable radio communication devices. The term portable radio communication device, which herein after is referred to as a mobile phone, a mobile device, a mobile radio terminal or a mobile terminal, includes all devices, including, but not limited to, mobile telephones, pagers, communicators, i.e., electronic organizers, smartphones, personal digital assistants (PDAs), or the like. A portable radio communication device may also be a GPS device. Moreover, while the present invention is being discussed with respect to portable radio communication devices, it is to be appreciated that the invention is not intended to be limited to portable radio communication devices, and can be applied to any type of electronic equipment capable of use for voice and/or data communication. As used herein, the term "GPS receiver" includes any electronic equipment capable of receiving GPS signals and determining its position from the received GPS signal information.

As used herein, the term "satellite" includes satellites in orbit anywhere around the globe as well as fabricated satellites. The term "simulated satellite" as used herein includes fabricated satellites that are not actually in orbit as well as actual satellites in orbit that are not visible to a GPS receiver because, for example, have orbits that are offset by approximately six hours and are located on the other side of the globe.

Figure 2:
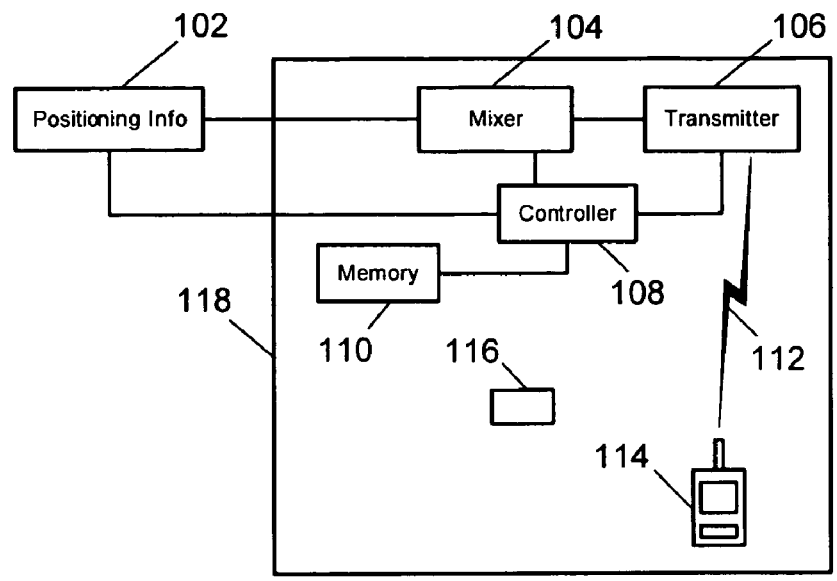
FIG. 2 is a diagrammatic illustration of a system for providing information to a GPS receiver according to the present invention.

Referring initially to FIG. 2, generally provided is a GPS communication system capable of providing information to a GPS receiver according to the present invention. Because GPS receivers 114 are often unable to receive GPS signals inside buildings, such as building 118, the system is configured to transmit a radio frequency signal 112 that can be received by a GPS receiver 114 inside a building. The information transmitted via the radio frequency signal 112 preferably causes the GPS receiver 114 to calculate its position as a predetermined apparent location 116. Preferably, regardless of the physical location of the GPS receiver 114, the GPS receiver 114 will calculate its GPS position as being located at the apparent location 116. The system may store the coordinates of the apparent location 116 in memory 110. The memory 110 may also have stored within it an application program that when executed causes the system to receive positioning information 102 from an external source and transmit the positioning information 102 as the radio frequency signal 112.

To generate the radio frequency signal 112, the system is configured to receive positioning information 102 that preferably includes C/A code information, almanac information and ephemeris information. In addition, the positioning information 102 also preferably includes timing information, which may be incorporated into ephemeris information. The positioning information 102 is preferably received from an external source. For example, the positioning information 102, in part or in total, may be received from an orbiting GPS satellite or from at least one source other than an orbiting GPS satellite, such as a remote server accessible via the Internet. Accordingly, the positioning information 102 may correspond to an above the horizon orbiting GPS satellite that is close to the location where the positioning information 102 is received. In addition, the positioning information 102 may correspond to a simulated satellite, which may represent a fabricated satellite with a different C/A code than all GPS satellites in orbit or an orbiting GPS satellite approximately 6 hours away from the location where the positioning information 102 is received. In the instance where the positioning information 102 is received from a fabricated satellite, the GPS receiver 114 is preferably configured to look for both actual orbiting GPS satellites and fabricated satellites. In addition, the positioning information 102 may or may not be aligned with GPS time, meaning that the positioning information 102 may not be aligned in time with a GPS signal from an above the horizon orbiting satellite that close to the location where the positioning information 102 is received. Moreover, a hybrid system may use positioning information 102 from both above the horizon orbiting satellites and non-satellite resources such as the Internet.

The positioning information 102 is then mixed by a mixer 104 and transmitted as radio frequency signal 112 by a transmitter 106. A controller 108 preferably controls the mixing and transmitting processes and can access the memory 110 and initiate any applicable application programs. As will be understood by those skilled in the art, the controller 108 may be implemented as one or combinations of the following: programmable circuit, integrated circuit, memory and I/O circuits, an application specific integrated circuit, microcontroller, complex programmable logic device, field programmable gate arrays, other programmable circuits, or the like.

The mixer 104 preferably receives positioning information 102 corresponding to the positions of a plurality of satellites. The positioning information 102 may be in the form of separate signals. Knowing the apparent location 116, the system is capable of creating a single radio frequency signal 112 that appears to the GPS receiver 114 as the off-the-air GPS signals it would receive if the GPS receiver 114 were located at the apparent location 116. For example, as will be understood by those skilled in the art, if the positioning information 102 is received from above the horizon orbiting GPS satellites, the GPS signals would be demodulated at the location they are received, e.g. at the top of a building, and then recreated with slight shifts, e.g. time shifts, so that the difference in time of the GPS signals matches the difference in time of GPS signals that would be received at the apparent location 116. The GPS receiver 114 then calculates the position of the GPS receiver position 114 as that of the apparent location 116 based on the differences in time of the GPS signal information transmitted as the radio frequency signal 112.

Figure 3:
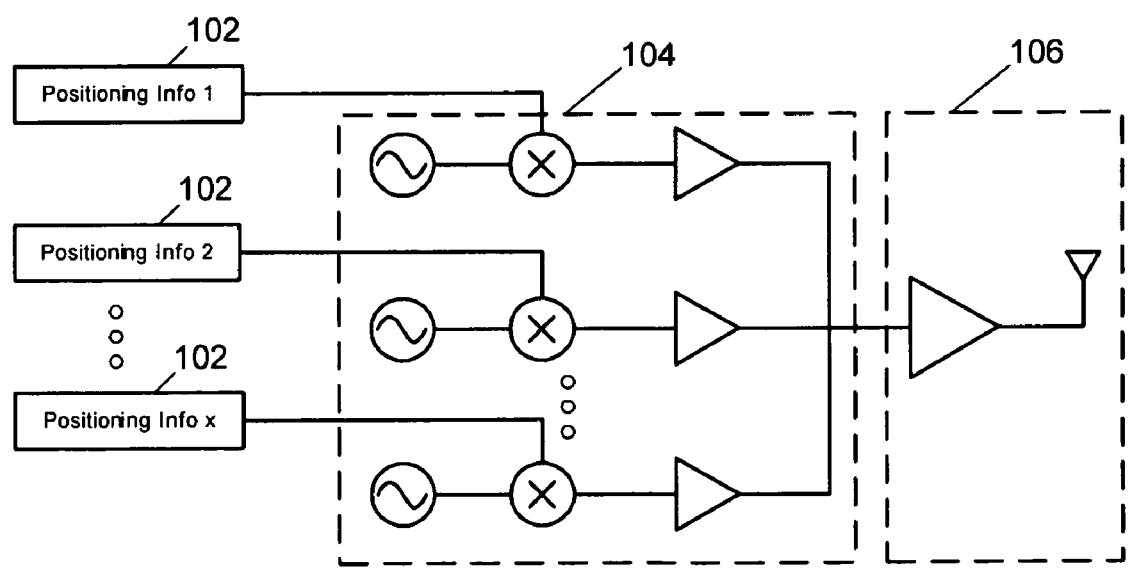
FIG. 3 is a more detailed schematic illustration of certain aspects of system of FIG. 1.

Turning next to FIG. 3, a more detailed schematic of the mixer 104 and transmitter 106 is provided. As shown, positioning information 102 corresponding to a plurality of satellites is received by the system having stored in memory 110 a predetermined apparent location. The positioning information 102 is then mixed by a mixer 104 to yield a single signal, e.g. mathematically added to yield a single signal. During the mixing process, the positioning information 102 may be shifted in time so that it will appear to the GPS receiver 114 that, for example, a first satellite is farther away than it actually is and a second satellite is closer than it actually is. This change in the appearance of the satellites with respect to the GPS receiver 114 causes the GPS receiver 114 to calculate its position as being different than its physical location. One skilled in the art will recognize that any positioning information 102 can be used so long as the corresponding positions of the satellites from the perspective of the GPS receiver 114 yield a calculated position approximately at the apparent location.

After the positioning information 102 is mixed by the mixer 104, the resulting signal is preferably amplified and then transmitted as radio frequency signal 112 by the transmitter 106. It is contemplated that the radio frequency signal 112 may be transmitted at the same frequency as the frequency at which GPS signals are transmitted from satellites. It is also contemplated that the radio frequency signal 112 may be transmitted at a higher data rate than the data rate at which GPS signals are transmitted from satellites. For example, the radio frequency signal 112 may be transmitted at 500 bit/sec instead of 50 bit/sec. This would decrease the amount of time required for the GPS receiver 114 to receive the navigation message. The GPS receiver would preferably be configured to receive the 500 bit/sec signals.

In addition, it is contemplated that the radio frequency signal 112 may be transmitted intermittently. It may be more likely that the GPS receiver will be able to receive off-the-air GPS signals when the transmitter 106 is not transmitting the radio frequency signal 112 than when the transmitter 106 is transmitting the radio frequency signal 112. In this way, the radio frequency signal 112 would present a lesser obstacle to the GPS receiver's ability to detect off-the-air GPS signals. In the case where the GPS receiver 114 is also able to receive an off-the-air GPS signal, the receiver may then be able to calculate its position using the intermittent radio frequency signal 112 as well as the off-the-air GPS signals. In such case, the GPS receiver would likely calculate its position as being somewhere between the apparent location 116 and the physical location of the GPS receiver 114. In addition, intermittent transmission lowers the probability that the radio frequency signal 112 will interfere with a GPS receiver outside the building. It may be desirable to use a GPS receiver configured to receive intermittent signals and recognize the intermittent transmission as not originating from an orbiting satellite.

In one specific embodiment, the controller 108 is programmed to use the positioning information 102 to generate simulated GPS signal bitstreams for at least three, and preferably four, satellites. The satellites may or may not be visible at the predetermined apparent location 116 even without obstructions, such as buildings, between the GPS receiver 114 and the satellites. In other words, the satellites may be above the horizon orbiting satellites or simulated satellites. First the low bitrate data stream is generated for each satellite. Each of the data streams is then chipped with the spreading code associated with the appropriate satellite. The controller 108 then calculates relative time delays between the signals using the apparent location 116 stored in memory 110, ephemeris data from positioning information 102 and an estimate of local time. In the preferred embodiment, the controller 108 also calculates the one-way delay for at least one of the three or more satellite signals. Using this one-way delay and the relative time delays, the controller provides the three or more simulated GPS signal bitstreams to the mixer 104 at an appropriate time and with appropriate differential time delays so that the GPS receiver 114 receiving those bitstreams would calculate its position as being approximately at the apparent location 116. The mixer 104 converts these bitstreams to a composite radio frequency signal (which may or may not be at the GPS data rate) that simulates the radio frequency signals from the three or more satellites that would be seen at the apparent location 116. The transmitter 106 then transmits the composite radio frequency signal.

Because the GPS receiver 114 may also receive off-the-air GPS signals from orbiting satellites, it may be desirable to create a modified radio frequency signal 112 that is identifiable by the GPS receiver 114 as originating from a source other than an orbiting GPS satellite. For example, one bit of the navigation data message associated with the C/A code on the radio frequency signal 112 could be changed to mark the radio frequency signal 112 as being different than off-the-air GPS signals. The GPS receiver 114 preferably would be specifically configured to recognize and differentiate off-the-air GPS signals from signals originating from the transmitter 106. One advantage of such a system is that the GPS receiver 114 would be less likely confuse off-the-air GPS signals with radio frequency signals 112 transmitted by the transmitter 106. Another advantage is that there is no need to align the radio frequency signal 112 with GPS time because the GPS receiver 114 would not use the radio frequency signal 112 together with an off-the-air GPS signal to calculate its position because it would recognize the signals as being different.

Figure 4:
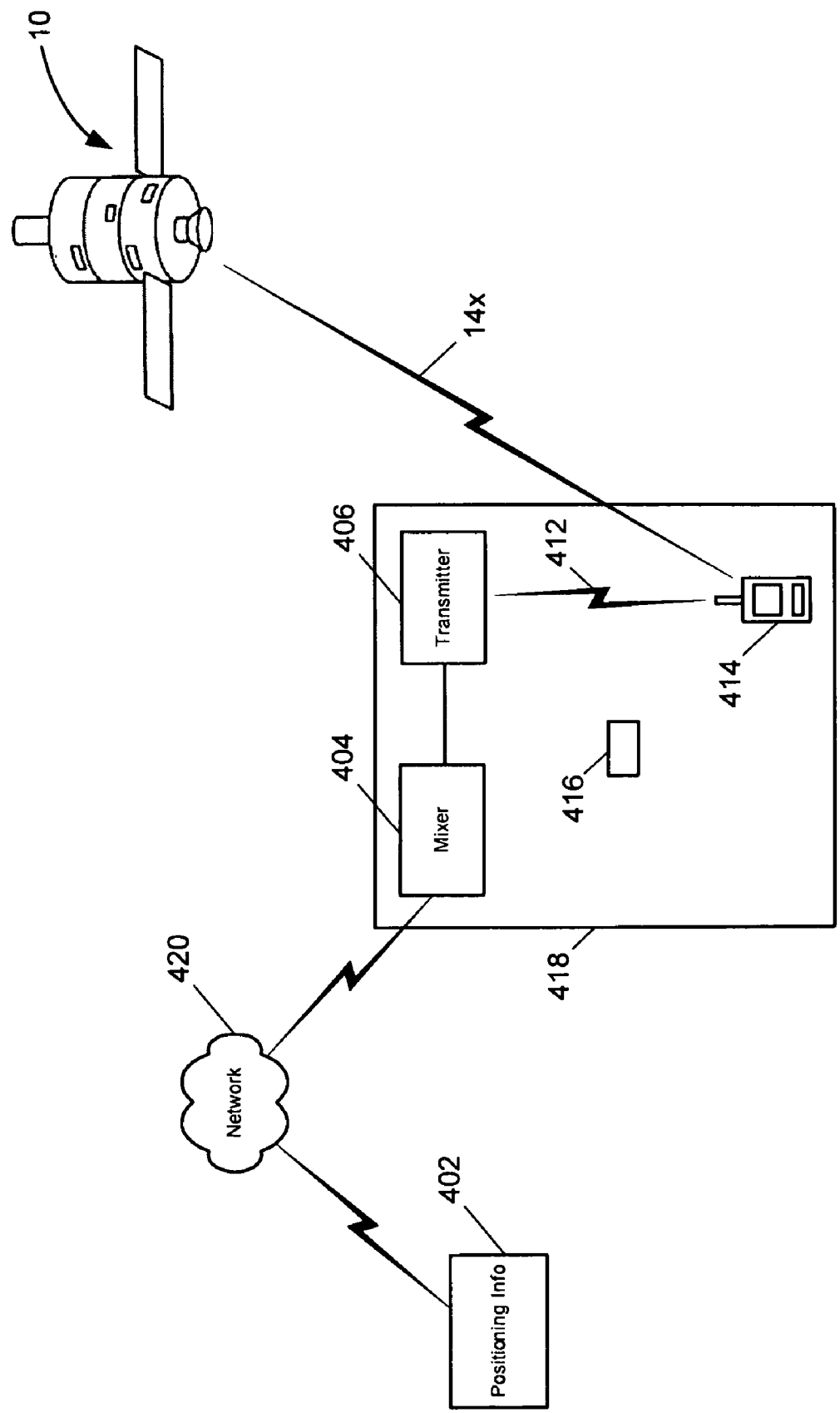
FIG. 4 is a diagrammatic illustration of an exemplary system for providing information to a GPS receiver where satellite positioning information is derived from a source other than an off-the-air GPS signal.

Turning next to FIG. 4, a GPS communication system configured to receive positioning information from a source other than orbiting GPS satellites 10 is provided. As shown, positioning information 402 is received via a network 420, such as the Internet. For example, the positioning information 402 may be stored on a server that is accessible via the network 420. The positioning information 402 thus originates from a source other than an orbiting GPS satellite. Like the system depicted in FIG. 2, the positioning information 402 is received by a controller (not shown) and memory (not shown) and is used to store the apparent location 416. Also like the system of FIG. 2, a mixer 404 is used to mix the positioning information 402 and a transmitter 406 is used to transmit the radio frequency signal 412 that is received by the GPS receiver 414.

Because the system of FIG. 4 receives positioning information 402 from a source other than an orbiting GPS satellite 10, the positioning information 402 used to create the radio frequency signal 412 may correspond to simulated satellites as opposed to the GPS satellites most closely orbiting the building 418 containing the apparent location 416. For example, the positioning information 402 may correspond to satellites having orbits that are offset by approximately six hours (on the other side of the globe) from the above the horizon satellites that are closest to the building 418.

Like the system of FIG. 2, the controller preferably generates simulated GPS signal bitstreams for at least three, and preferably four, satellites corresponding to the positioning information 402. Each of the data streams is then chipped with the spreading code associated with the appropriate satellite. The controller would then calculate relative time delays between the signals using the apparent location 416 stored in memory and ephemeris data from positioning information 402. In the preferred embodiment, the controller also calculates the one-way delay for at least one of the three or more satellite signals. Using this one-way delay and the relative time delays, the controller provides the three or more simulated GPS signal bitstreams to the mixer 404 at an appropriate time and with appropriate differential time delays so that the GPS receiver 414 receiving those bitstreams would calculate its position as being approximately at the apparent location 416. The mixer 404 converts these bitstreams to a composite radio frequency signal (which may or may not be at the GPS data rate) that simulates the radio frequency signals from the three or more satellites that would be seen at the apparent location 416. The transmitter 406 then transmits the composite radio frequency signal.

One advantage of using simulating satellites representing satellites having orbits that are offset by approximately six hours is that the C/A codes of the simulated satellites do not conflict with those used by the satellites that above the horizon, thereby minimizing potential conflict between the simulated and above the horizon satellites. If the GPS receiver 414 happens to receive an off-the-air GPS signal, such as GPS signal 14x, it is more likely that the GPS receiver 414 will ignore the off-the-air GPS signal 14x as an outlier because it is so different than the information it received via the radio frequency signal 412. As a result, it may not be necessary to align the simulated satellites with GPS time. Once the GPS receiver 414 leaves the building 418, it would lose the radio frequency signal 412 completely, acquire off-the-air GPS signals 14x and calculate its position. In addition, to further avoid possible confusion on the part of the GPS receiver 414, the GPS receiver 414 could also be configured to recognize that the radio frequency signal 412 contains positioning information for simulated satellites and not positioning information for above the horizon orbiting GPS satellites.

In addition, the positioning information 402 corresponding to satellites having orbits that are offset by approximately six hours may also be time shifted to match GPS time. In other words, the positioning information 402 includes navigation bits and ephemeris data that are properly matched to the above the horizon orbiting GPS satellites. The ephemeris data can be shifted so that it matches the current time or the time in the navigation bits can be shifted to correspond to the time six hours ago. In either case, ephemeris data is shifted with respect to time. As long as the system is aligned with GPS time, the receiver 414 can receive GPS signals 14x from one or more GPS satellites 10 and use the information together with the information contained in the radio frequency signal 412 to determine the location of the GPS receiver 414. In this instance, the GPS receiver 414 would likely determine its position to be somewhere between the apparent location 416 and its physical location. Again, it may be desirable for the GPS receiver 414 to be capable of distinguishing between the off-the-air GPS signals 14x and the radio frequency signal 412.

Figure 5:
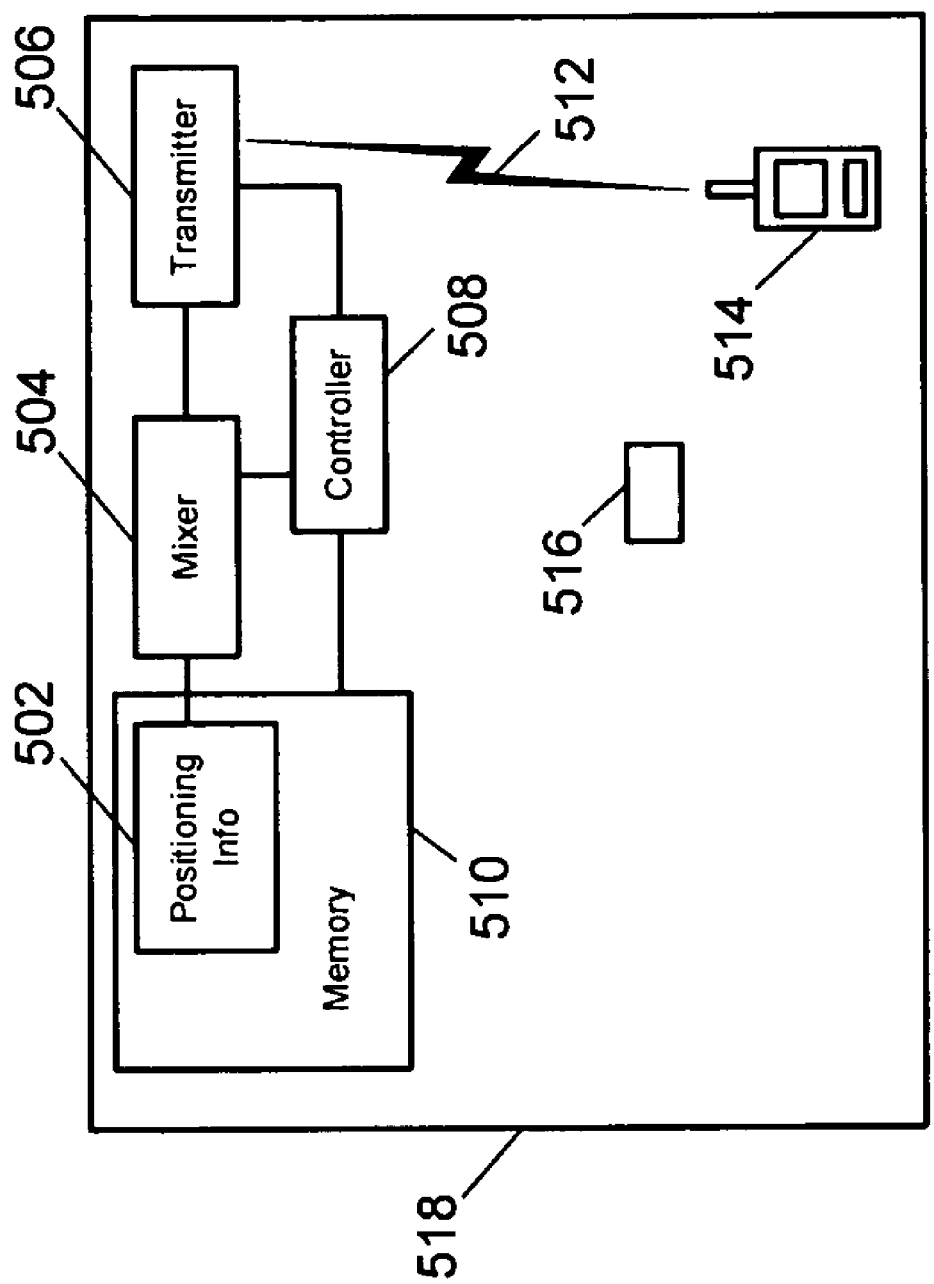
FIG. 5 is a diagrammatic illustration of another exemplary system for providing information to a GPS receiver where satellite positioning information is derived from a source other than an off-the-air GPS signal.

Turning next to FIG. 5, another GPS communication system configured to receive positioning information from a source other than orbiting GPS satellites is provided. As shown, positioning information 502 is stored in memory 510. The positioning information 502 thus originates from a source other than an orbiting GPS satellite. The positioning information 502 may be entirely fabricated. For example, C/A codes can be associated with fabricated ephemeris and almanac information to create satellite signals that is receivable by the GPS receiver 514. The C/A codes may correspond to orbiting satellites or they may correspond to fabricated satellites. If the C/A codes correspond to fabricated satellites, it is preferable that the GPS receiver 514 be configured to receive signals containing the fabricated satellite C/A codes.

The controller 508 preferably combines the C/A codes and navigation information to create the positioning information 502 that is stored in memory 510. The memory 510 also preferably stores the apparent location 516. The mixer 504 then receives the positioning information 502 created by the controller 508 and mixes the positioning information 502. A transmitter 506 transmits then a radio frequency signal 512 that is received by the GPS receiver 514.

Because the system of FIG. 5 receives positioning information 502 from a source other than an orbiting GPS satellite 10, the positioning information 502 used to create the radio frequency signal 512 preferably corresponds to simulated satellites, which may have a C/A code that corresponds to an existing orbiting satellite or may have a C/A code that corresponds only to a fabricated satellite. Preferably, the C/A codes correspond to satellites offset by approximately six hours from the apparent location 516 because they are on the other side of the globe and will not interfere with the potentially visible satellite signals originating from above the horizon satellites. Like the system of FIG. 2, the controller 508 preferably generates simulated GPS signal bitstreams for at least three, and preferably four, satellites corresponding to the positioning information 502. Each of the data streams is then chipped with the spreading code associated with the appropriate satellite. The controller 508 then calculates relative time delays between the signals using the apparent location 516 stored in memory and ephemeris data from positioning information 502. In the preferred embodiment, the controller 508 also calculates the one-way delay for at least one of the three or more satellite signals. Using this one-way delay and the relative time delays, the controller provides the three or more simulated GPS signal bitstreams to the mixer 504 at an appropriate time and with appropriate differential time delays so that the GPS receiver 514 receiving those bitstreams would calculate the position of the GPS receiver as being approximately at the apparent location 516. The mixer 504 converts these bitstreams to a composite radio frequency signal (which may or may not be at the GPS data rate) that simulates the radio frequency signals from the three or more satellites that would be seen at the apparent location 516. The transmitter 506 then transmits the composite radio frequency signal.

One advantage of using simulating satellites with fabricated ephemeris and almanac information is that the navigation information of the satellites does not need to be updated. Thus, the system can be entirely self contained as it would not need to be connected to a network or receive information from orbiting satellites. The simulated satellites may or may not be aligned with GPS time. If the simulated satellites were not aligned with GPS time, the GPS receiver 514 would lose the radio frequency signal 512 completely when it leaves the building and then acquire off-the-air GPS signals 14x to calculate its position. In addition, to further avoid possible confusion on the part of the GPS receiver 514, the GPS receiver 514 could also be configured to recognize that the radio frequency signal 512 contains positioning information for simulated satellites and not positioning information for above the horizon orbiting GPS satellites.

If the simulated satellites are aligned with GPS time, however, the receiver 514 may be able to receive GPS signals 14x from one or more GPS satellites 10 and use the information together with the information contained in the radio frequency signal 512 to determine the location of the GPS receiver 514. In this instance, the GPS receiver 514 would likely determine its position to be somewhere between the apparent location 516 and its physical location. Again, it may be desirable for the GPS receiver 514 to be capable of distinguishing between the off-the-air GPS signals 14x and the radio frequency signal 512.

Figure 6:
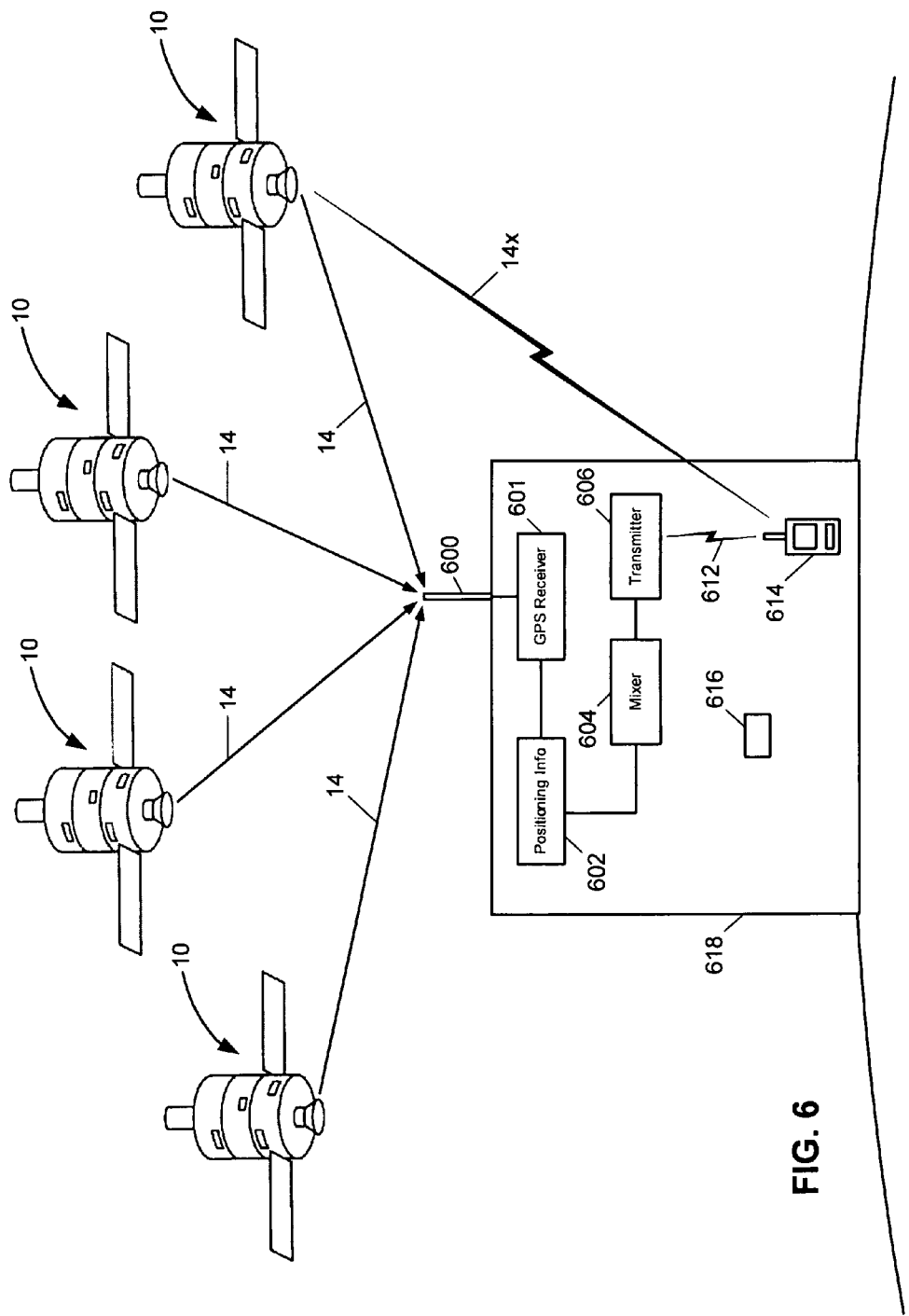
FIG. 6 is a diagrammatic illustration of an exemplary system for providing information to a GPS receiver where satellite positioning information is derived from off-the-air GPS signals.

Turning next to FIG. 6, a GPS communication system configured to receive positioning information from orbiting GPS satellites 10 is provided. As shown, positioning information 602 is received via off-the-air GPS signals 14 transmitted from orbiting GPS satellites 10. Like the system depicted in FIG. 4, the positioning information is received by a controller (not shown) and memory (not shown) is used to store the apparent location 616. Also like the systems of FIGS. 2 and 4, a mixer 604 is used to mix the positioning information 602 and a transmitter 606 is used to transmit a radio frequency signal 612 that is received by the GPS receiver 614. Unlike the system of FIG. 4, however, the system of FIG. 6 also includes a GPS antenna 600 and GPS receiver 601. The antenna 600 receives the off-the-air GPS signals 14 and the GPS receiver 601 demodulates the received GPS signals 14 to generate the positioning information 602.

Like the system of FIGS. 2 and 4, the controller preferably generates simulated GPS signal bitstreams for at least three, and preferably four, satellites corresponding to the positioning information 602. Each of the data streams is then chipped with the spreading code associated with the appropriate satellite. The controller then calculates relative time delays between the signals using the apparent location 616 stored in memory and ephemeris data from positioning information 602. In the preferred embodiment, the controller also calculates the one-way delay for at least one of the three or more satellite signals. Using this one-way delay and the relative time delays, the controller provides the three or more simulated GPS signal bitstreams to the mixer 604 at an appropriate time and with appropriate differential time delays so that the GPS receiver 614 receiving those bitstreams would calculate its position as the apparent location 616. The mixer 604 converts these bitstreams to a composite radio frequency signal (which may or may not be at the GPS data rate) that simulates the radio frequency signals from the three or more satellites that would be receivable by the GPS receiver 614 without interference from the building 618. The transmitter 606 then transmits the composite radio frequency signal 612 to the GPS receiver 614.

In addition, it may be preferable to align the positioning information 602 with GPS time so that the positioning information 602 includes navigation bits and ephemeris data that are properly matched to the above the horizon orbiting GPS satellites 10. If the positioning information 602 is aligned with GPS time, the receiver 614 can receive off-the-air GPS signals 14x from one or more GPS satellites 10 and use the information together with the information contained in the radio frequency signal 612 to determine the location of the GPS receiver 614. In this instance, the GPS receiver 614 would likely determine its position to be somewhere between the apparent location 616 and its physical location. Again, it may be desirable for the GPS receiver 614 to be capable of distinguishing between the off-the-air GPS signals 14x and the radio frequency signal 612.

In addition to providing a radio frequency signal to replace off-the-air GPS signals, it may also be preferable to provide a radio frequency signal containing positioning information such that the GPS receiver could use the received positioning information in addition to off-the-air GPS signals in order to determine its position. It is known that GPS receivers can receive much weaker GPS signals than they can demodulate. For example, while a typical GPS receiver might only be capable of demodulating GPS signals of −140 dBm and greater, a typical GPS receiver may be able to receive GPS signals of −160 dBm and greater. A GPS receiver capable of receiving navigation information from another source would be able to calculate its position using weaker off-the-air GPS signals, which may be accessible to the GPS receiver 114 as off-the-air GPS signals passing through a nearby window, for example. Thus, in one embodiment of the present invention, positioning information is transmitted to the GPS receiver via a radio frequency signal. The GPS receiver is configured to receive the radio frequency signal containing positioning information. The GPS receiver is further configured to use the positioning information to determine the positions of a plurality of satellites (preferably at least three). The GPS receiver is further configured to use off-the-air GPS signals to determine its position with respect to the position of the satellites. In this manner, the GPS receiver is capable of determining its position from a much weaker off-the-air GPS signal.

It will be understood by those skilled in the art that the positioning information sent with the radio frequency signal may be provided to a GPS receiver in an form, such as using conventional mobile or cellular services such as SMS, GPRS, etc., a WLAN interface (e.g., a wireless network based on the 802.11a, b and/or g standard), a satellite interface, a Bluetooth interface, or any communication medium available to the GPS receiver, which may be configured to receive any type of radio frequency signal.

Figure 7:
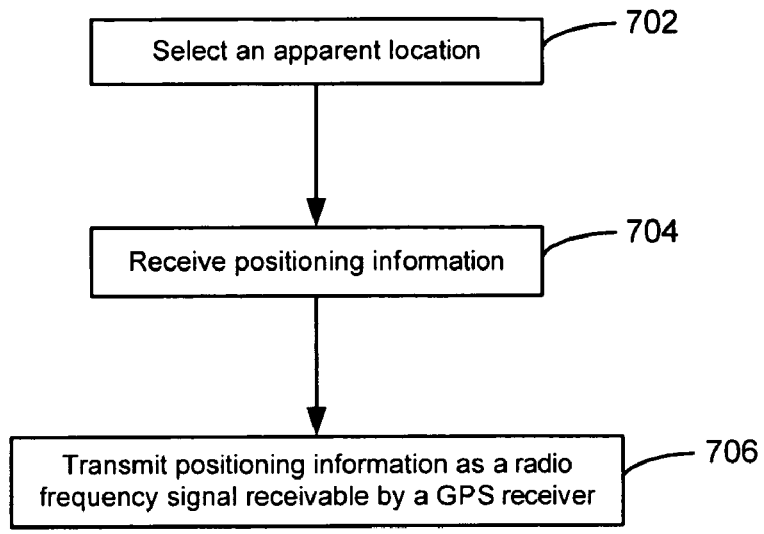
FIG. 7 is a flow chart illustrating a method according to the present invention for providing information to a GPS receiver.

Turning next to FIG. 7, a flow chart is provided illustrating a method according to the present invention for providing information to a GPS receiver. Flow begins at process block 702, wherein an apparent location is selected. The apparent location may be, for example, located inside a building. Flow then continues to process block 704. At process block 704, positioning information corresponding to a plurality of satellites is received. The positioning information may be from a source that simulates the positioning information. Progression then flows to process block 706 wherein the positioning information is transmitted as a radio frequency signal that can be received and used by a GPS receiver to calculate the position of the GPS receiver as being located at the apparent location, regardless of the physical location of the GPS receiver.

Figure 8:
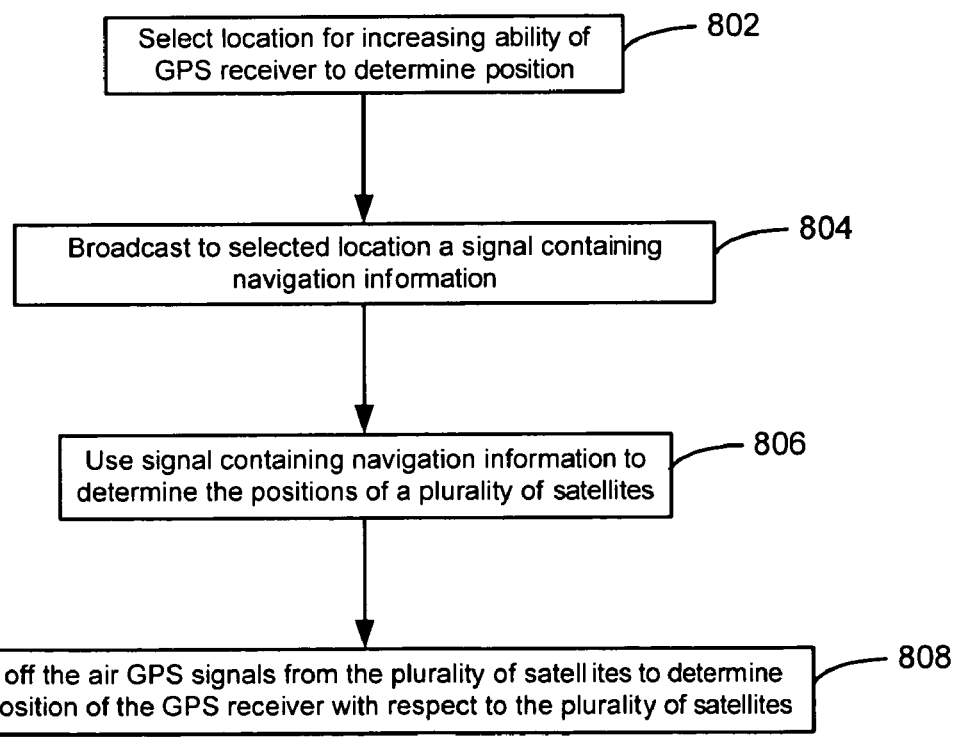
FIG. 8 is a flow chart illustrating a method according to the present invention for increasing the ability of a GPS receiver to determine its position.

FIG. 8 is a flow chart illustrating a method according to the present invention for increasing the ability of a GPS receiver to determine its position. Flow begins at process block 802, wherein a location of space is selected within which to increase the ability of a GPS receiver to determine its position. Flow then continues to process block 804 wherein a signal containing navigation information for a plurality of orbiting GPS satellites is broadcast to the selected location. Progression then continues to process block 806 wherein the positions of the plurality of orbiting GPS satellites are determined using the signal containing the navigation information. Flow then continues to process block 808 wherein the position of the GPS receiver is determined with respect to the plurality of orbiting GPS satellites using off-the-air GPS signals from the plurality of orbiting GPS satellites.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

The invention claimed is:

1. A method for providing information to a GPS receiver comprising:
 receiving a predetermined apparent location that is different than a location of the GPS receiver;
 receiving positioning information corresponding to the positions of a plurality of satellites, wherein the positioning information is received at a location that is different than the predetermined apparent location;
 following receipt of the positioning information, time shifting the positioning information for at least one of the plurality of satellites with respect to the positioning information for the other of the plurality of satellites such that the time shifted positioning information correlates approximately to the position of the predetermined apparent location;
 mixing the time shifted positioning in formation to generate a radio frequency signal that can be received and used by the GPS receiver to calculate the position of the GPS receiver as being located approximately at the predetermined apparent location;
 transmitting the radio frequency signal.

2. The method of claim 1 wherein the positioning information comprises almanac information, ephemeris information and C/A code information.

3. The method of claim 2 wherein the positioning information further comprises timing information.

4. The method of claim 1 wherein at least part of the positioning information is received from an orbiting GPS satellite.

5. The method of claim 1 further comprising aligning the positioning information with GPS time such that a GPS receiver can determine the position of the GPS receiver using an off-the-air GPS signal together with the radio frequency signal containing positioning information.

6. The method of claim 1 wherein the GPS receiver is a mobile phone.

7. The method of claim 1 wherein the radio frequency signal is identifiable by a GPS receiver as originating from a source other than an orbiting GPS satellite.

8. The method of claim 7 further comprising receiving the radio frequency signal at a GPS receiver and determining the position of the GPS receiver using information contained in the radio frequency signal.

9. The method of claim 1 wherein the radio frequency signal is transmitted intermittently.

10. The method according to claim 9, wherein steps of the method are executed according to an application program loaded or stored on electronic hardware communicably coupled to a radio frequency transmitter.

11. The method of claim 1 wherein the data rate of the radio frequency signal is greater than the data rate of an off-the-air GPS signal.

12. The method according to claim 1, wherein steps of the method are executed according to an application program loaded or stored on electronic hardware communicably coupled to a radio frequency transmitter.

13. The method of claim 1 further comprising receiving the radio frequency signal at a GPS receiver and determining the position of the GPS receiver using information contained in the radio frequency signal.

14. The method of claim 13 wherein the position of the GPS receiver is determined using only information contained in the radio frequency signal.

15. The method of claim 13 wherein determining the position of the GPS receiver comprises determining the positions of a plurality of orbiting GPS satellites using the information contained in the radio frequency signal and determining the position of the GPS receiver with respect to the plurality of orbiting GPS satellites using off-the-air GPS signals from the plurality of orbiting GPS satellites.

16. The method of claim 15 wherein the positioning information is received from at least one source other than an off-the-air GPS signal.

17. The method of claim 13 wherein the radio frequency signal is at least one of a mobile service signal, a wireless network based, a satellite signal, a Bluetooth signal, or any communication medium available to the GPS receiver.

18. The method of claim 1 wherein the predetermined apparent location and the GPS receiver are inside a building.

19. The method of claim 1 wherein at least some of the positioning information is received from at least one source other than an off-the-air GPS signal.

20. The method of claim 18 wherein the positioning information is not aligned with GPS time.

21. The method of claim 18 wherein the at least one source other than an off-the-air GPS signal comprises a remote server accessible via the Internet.

22. The method of claim 18 wherein at least some of the positioning information corresponds to the position of a simulated satellite.

23. The method of claim 21 wherein the positioning information comprises C/A codes and fabricated ephemeris and time information.

24. The method of claim 22 wherein the positioning information corresponding to the position of the simulated satellite is derived from a satellite having an orbit that is offset by approximately six hours from the predetermined apparent location.

25. The method of claim 24 wherein the positioning information corresponding to the position of the simulated satellite is aligned with GPS time such that a GPS receiver can use an off-the-air GPS signal together with the radio frequency signal containing positioning information corresponding to the position of the simulated satellite to determine the position of the GPS receiver.

26. The method of claim 24 wherein all of the positioning information corresponds to the positions of simulated satellites having orbits that are offset by approximately six hours from the predetermined apparent location.

27. The method of claim 26 wherein the positioning information corresponding to the position of the simulated satellites is not aligned with GPS time.

28. The method of claim 1 wherein the radio frequency signal is transmitted at the same frequency as signals transmitted from orbiting GPS satellites.

29. A system for transmitting information to a GPS receiver comprising:
a memory for storing a predetermined apparent location and an application program; and
a controller that executes the application program, the application program when executed causing the system to:
receive positioning information corresponding to positions of a plurality of satellites, wherein the positioned information is received at a location that is different than the predetermined apparent location;
following receipt of the positioning information, time shifting the positioning information for at least one of the plurality of satellites with respect to the positioning information for the other of the plurality of satellites such that the time shifted positioning information correlates approximately to the position of the predetermined apparent location;
mix the time shifted positioning information to generate a radio frequency signal that can be received and used by the GPS receiver to calculate the position of the GPS receiver as being located approximately at the predetermined apparent location irrespective of the actual position of the GPS receiver; and
transmit the radio frequency signal.

30. The system of claim 29 wherein the application program when executed further causes the system to align the positioning information with GPS time such that a GPS receiver can determine the position of the GPS receiver using an off-the-air GPS signal together with the radio frequency signal containing positioning information.

31. The system of claim 29 wherein the radio frequency signal is identifiable by a GPS receiver as originating from a source other than an orbiting GPS satellite.

32. The system of claim 29 wherein at least some of the positioning information is received from at least one source other than an off-the-air GPS signal.

33. The system of claim 32 wherein the positioning information is not aligned with GPS time.

34. The system of claim 32 wherein at least some of the positioning information corresponds to the position of a simulated satellite.

35. The method of claim 34 wherein the positioning information comprises C/A codes and fabricated ephemeris and almanac information.

36. The system of claim 34 wherein the positioning information corresponding to the position of the simulated satellite is derived from a satellite having an orbit that is offset by approximately six hours from the predetermined apparent location.

37. The system of claim 36 wherein the positioning information corresponding to the position of the simulated satellite is aligned with GPS time such that a GPS receiver can use an off-the-air GPS signal together with the radio frequency signal containing positioning information corresponding to the position of the simulated to determine the position of the GPS receiver.

38. The system of claim 36 wherein all of the positioning information corresponds to the positions of simulated satellites having orbits that are offset by approximately six hours from the predetermined apparent location.

39. The system of claim 34 wherein the positioning information corresponding to the position of the simulated satellites is not aligned with GPS time.

40. The method of claim 29 wherein the radio frequency signal is transmitted at the same frequency as signals transmitted from orbiting GPS satellites.

41. A method for providing information to a GPS receiver comprising:
receiving a predetermined apparent location;
receiving positioning information corresponding to the positions of a plurality of satellites, wherein the positioning information is received at a location that is different than the predetermined apparent location;

following receipt of the positioning information, time shifting the positioning information for at least one of the plurality of satellites with respect to the positioning information for the other of the plurality of satellites such that the time shifted positioning information correlates approximately to the position of the predetermined apparent location;

using the time shifted positioning information and predetermined apparent location to generate a single radio frequency signal that can be received and used by a GPS receiver to calculate the position of the GPS receiver as being located approximately at the predetermined apparent location;

transmitting the radio frequency signal from a location that is different than the predetermined apparent location at the same frequency as signals transmitted from orbiting GPS satellites.

* * * * *